United States Patent Office 3,136,645
Patented June 9, 1964

3,136,645
PRODUCTION OF MINERAL FOAM
Howard M. Dess, Niagara Falls, N.Y., assignor to Union Carbide Corporation, a corporation of New York
No Drawing. Filed Dec. 20, 1960, Ser. No. 77,035
3 Claims. (Cl. 106—75)

This invention relates to a solidified mineral foam and to a process for preparing the foam.

It would be desirable to have a mineral structural material of high-porosity for use as thermal insulation as well as for fabrication into load-bearing insulating wall panels etc. Such a material should be desirably easily fashioned and resistant to relatively high-temperatures. Many materials are known for such purposes. However, many of the high-temperature insulating materials of this class require high-temperature in their manufacture thereby necessitating expensive furnacing and handling equipment.

In my copending application Serial No. 77,064, filed on December 20, 1960, in the names of H. M. Dess and H. F. Kummerle, I have disclosed and claimed a method for preparing a suitable porous mineral foam of the type described. However, even the process described therein requires slightly elevated temperatures to effect the setting of the mineral foam.

It is an object of this invention to provide a solidified mineral foam having the qualities of easy fabrication into shapes and relatively high-temperature thermal stability.

It is another object of this invention to provide an insulating structural material.

Still another object of this invention is to provide a process for the production of such a mineral foam whereby setting of the foam is chemically induced without the necessity of applying additional heat.

Other objects will be apparent from the subsequent disclosure and appended claims.

The solidified mineral foam of the present invention is produced in accordance with the process of the present invention by reacting finely-divided silicon with a foamable mixture consisting of pulverized silica and aqueous sodium silicate solution containing sodium fluosilicate and a suitable surface active agent dissolved therein.

During the course of the reaction silicon reacts with the sodium silicate solution to produce a foaming reaction. 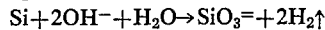 This is believed to be represented in its simplest form by the equation:

$$Si + 2OH^- + H_2O \rightarrow SiO_3^= + 2H_2\uparrow$$

The hydrogen is released from the surface of the silicon particles as a myriad of tiny bubbles which tend to become entrapped in the viscous slurry. A foam is produced which gradually rises in the container.

Simultaneously chemical setting is occurring by the reaction of the sodium fluosilicate with the reaction mixture. It is believed that setting results from hydrolysis of the fluosilicate ion to form a hydrated silica network throughout the foam. The setting reaction is believed to proceed according to the equation:

$$SiF_6^= + 4OH^- + nH_2O \rightarrow SiO_2 \cdot (n+2)H_2O + 6F^=$$

Since the setting reaction and the foaming reaction are proceeding concurrently it is desirable to control the reactions. Thus, it is undesirable to have the reaction mixture set before the foam has reached the desired degree of gasification; similarly, it is undesirable to have the gasification become excessive before setting occurs.

The setting reaction commences almost immediately after the addition of the setting agent. Normally when powdered silicon is mixed with the sodium silicate solution a substantial period of time elapses prior to hydrogen evolution. This is a function of the ratio of $SiO_2$ to $Na_2O$ in the sodium silicate used as well as the temperature of the reaction mixture. For any given temperature, decreasing the $SiO_2$-to-$Na_2O$ ratio decreases the period of time before hydrogen evolution begins. Increasing the temperature also decreases the period of time. Thus, at room temperature gas evolution does not usually start until a number of hours have elapsed; at 50° C. hydrogen evolution begins in 3 to 4 minutes. However, at these elevated temperatures, the setting reaction is greatly accelerated so that setting is substantially complete by the time gas evolution begins. To avoid these problems several alternative methods are available.

The first of these comprises using active silicon for the reactant. As employed herein the term "active silicon" designates silicon having at least a substantial portion of its surface free from oxide coatings. This may be obtained by any one of several means. The silicon powder may be treated with hydrofluoric acid to remove any oxide coating. For example, equal weights of through 400 mesh silicon powder and 3 percent aqueous hydrofluoric acid solution may be mixed and permitted to stand for about 2½ hours to obtain complete activation. While 3 percent acid is preferred, anywhere from 2 percent up to about 20 percent acid is quite suitable. The silicon powder moist with hydrofluoric acid solution may be added directly to the reaction mixture. The second method is to produce silicon in a non-oxidizing atmosphere and maintain it in such an atmosphere until a time for addition to the reaction mixture. Still another method is to grind the silicon in a non-reactive atmosphere such as a vacuum or in an atmosphere of an inert gas such as argon. When active silicon is employed instantaneous reaction begins at room temperature and the desired matching rates of gas evolution and setting are achieved.

A method for avoiding the necessity of activating the silicon utilizes sodium silicate solution of relatively high $Na_2O/SiO_2$ ratio. Thus, for silicon which has not been activated commercial grades C and M sodium silicate are suitable, with grade C being preferred. However, even when activated silicon is used, setting occurs too rapidly when the $Na_2/SiO_2$ ratio is much less than in the N grade; setting is too slow with ratios much above that for the K grade. The specification of the commercial grades of sodium silicate are provided in Table I.

TABLE I

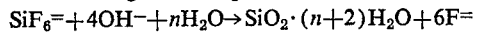

| Grade | $Na_2O/SiO_2$ | Percent $Na_2O$ | Percent $SiO_2$ | Percent water | Degrees Baumé |
|---|---|---|---|---|---|
| N | 1:3.22 | 8.9 | 28.7 | 62.4 | 41.0 |
| K | 1:2.90 | 11.0 | 31.9 | 57.1 | 47.0 |
| M | 1:2.54 | 12.85 | 32.6 | 54.55 | 50.5 |
| C | 1:2.00 | 18.0 | 36 | 46.0 | 59.3 |

Within the limitations described previously technical grade silicon is satisfactory. A typical analysis is silicon 92 percent to 98 percent with the balance incidental impurities. It is desirably employed as a fine powder. A through 400 mesh fraction is found to be quite superior for the hydrogen evolving reaction. For K grade sodium silicate, the usual range of activated silicon is from about 0.0125 to 0.0625 part of activated silicon slurry per part of silicate solution.

The silica can be any naturally occurring material of the order of about 97 percent pure and greater, capable of passing through a 325 mesh screen.

When activated silicon is employed, the proportions of silica in the reaction mixture should be such that the silica to sodium silicate solution weight ratio is in the range of from about 2.3 to 1 to about 0.73 to 1. If the silica to sodium silicate ratio is too high, the viscosity of the mix is too high; the resulting mix will be difficult to work and the density of the final product will be too high. If the ratio is too low, both the density and strength of the final product will be too low. The most satisfactory reaction mix utilizes a silica to grade K sodium silicate solution ratio of about 1.25 to 1.

Commercial grade sodium fluosilicate is suitable for the setting agent. For efficient operation, the particle size should be a maximum of through 325 mesh. A typical analysis is 99 percent $Na_2SiF_6$ with the balance incidental impurities. The ratio of sodium fluosilicate to sodium silicate solution ($SiO_2/Na_2O=2.9$) must be in the range of from about 0.172 to 1 to about 0.064 to 1, and preferably about 0.138 to 1. However, these figures are a function of the ratio of $SiO_2$ to $Na_2O$ in the sodium silicate solution used. As the ratio increases, the range of ratio of fluosilicate to silicate should be revised downward, and vice versa. If too little sodium fluosilicate is used, proper setting action does not occur. Also, the product is much more liable to crack.

In U.S. Patent No. 2,921,357 to Kinjiro Fujii and Yoshihiko Ishido there is described a process wherein sodium silicate and sodium fluosilicate are employed to produce a heat insulating refractory. However, as is readily apparent from this patent the ranges of reactants employed and the techniques of effecting the reaction are quite different. As might be expected the properties of the product and the characteristics of the reaction are equally quite different. For example, the process of the patent requires a much longer period of time to harden the product than the process of the present invention.

It is necessary to utilize a surface active agent in the reaction mixture. These materials increase the foamability of the solution as well as promote rapid dissociation of the bubbles from the silicon particles. The class of surface active agents which have been found to give the best results are the alkyl-substituted quaternary ammonium salts of the type.

$$[(R)N(CH_3)_3]^+X^-$$

wherein R is a long chain alkyl group containing at least 16 carbon atoms and up to 18, and wherein $X^-$ is a halogen ion such as $Cl^-$ or $Br^-$. Particularly suitable surface active agents included within this group are hexadecyltrimethyl-ammonium bromide, and a mixture of quarternary ammonium salts in which the R groups are hexadecyl, octadecyl and octadeca-dienyl. The concentration of surface active agent in the sodium silicate solution should be in the range of from about 0.1 percent to about 1 percent. When the agent is the aforesaid mixture, the preferred concentration is about 0.2 percent whereas with hexadecyltrimethyl ammonium bromide a concentration of about 0.1 percent is preferred.

In combining the reactants several methods are available to insure proper control of the several reactions. One method is to add simultaneously the active pulverized silicon metal and the setting agent to the sodium silicate solution that is slightly warmed. Another method consists of adding the silicon metal to the mixture of silica-sodium silicate solution and fluosilicate at the time when the setting reaction has progressed to the point where the setting begins to proceed rapidly. This point can be determined by measuring the rate of change of viscosity of a test sample consisting of only silica-sodium silicate solution and the setting agent. By plotting a graph of viscosity versus time the period of rapid rise of viscosity can be readily determined. This usually amounts to about 30 to 40 minutes for a mix having a composition of the proportions set forth in Example I.

The reactions are normally carried out at room temperature; however, a faster rise and set is obtained at slightly elevated temperatures. For commercial production, a range of from about 30° C. to about 40° C. is desirable.

*Example I*

One part by weight of surface active agent was dissolved in one milliliter of water. The surface active agent was a long chain alkyl-substituted quaternary ammonium salt containing from 16 to 18 carbon atoms per alkyl group. The aqueous solution of surface active agent was then added to 80 parts by weight of grade K sodium silicate solution. One hundred parts by weight of silica (particle size of through 325 mesh) were stirred into the sodium silicate solution until a smooth slurry was formed. In a separate container 70 grams of through 400 mesh silicon powder were treated with 300 milliliters of 10 percent hydrofluoric acid solution for ½ hour. The slurry was filtered and the wet cake of silicon was added to ½ of its weight of 1 percent hydrofluoric acid solution (to preserve its activity) and mixed to form a thick paste with the silicon content approximately 48 percent to 52 percent. Eleven parts by weight of sodium fluosilicate and about 4 milliliters of water were mixed with the silicon paste and mixed thoroughly to form a homogeneous slurry. To 2 grams of the silicon paste and 4 milliliters of water were added 11 grams of sodium fluosilicate, and the mixture was stirred rapidly into the silica-sodium silicate-surface active agent system. Gas evolution began instantaneously and a slow gradual rise in the material in the container was discerned. After the addition of the active silicon-$Na_2SiF_6$ slurry to the mix no further manipulation or operation was required. The foam rise and set was entirely self-regulating from that point on. The resulting product had a bulk density of 28.4 pounds per cubic foot after drying at 100° C., compressive strength of 200 pounds per square inch and a thermal conductivity of 0.9 B.t.u.-inches/ft.$^2$/hr./° F. at 100° F. mean sample temperature.

*Example II*

The procedure of Example I was repeated except that 10 grams of the silicon paste were added to the silica-sodium silicate-surface active agent system. The resulting product had a bulk density of 9.6 lb./ft.$^3$, a compressive strength of 10 p.s.i. and a thermal conductivity of 0.6 B.t.u.-inches/ft.$^2$/hr./° F.

The product and process of the present invention differ from that in my copending application in that in the present invention water is chemically tied up in the product whereas in the process of my copending application setting is caused by the loss of water resulting from thermal treatment. If it is desired that the product of the present invention be freed from water, this may be accomplished by a simple baking operation. By heat treating the products at 850° C. to 1050° C., the strength is improved and the resistance to water is greatly increased. The product of the present invention has a more uniform distribution of fine pores than the coarser pored product of my copending application.

What is claimed is:

1. A process for the production of a solidified mineral foam which comprises intimately mixing silica, silicon, aqueous sodium silicate solution wherein the ratio of $Na_2O$ to $SiO_2$ is in the range of from about 1:3.22 to about 1:2.0, sodium fluosilicate and a surface active agent, said silica having a maximum particle size of through 325 mesh and being present in filler proportions, said silicon having a maximum particle size of through 400 mesh and being present in foam-producing proportions, said sodium fluosilicate having a maximum particle size of through 325 mesh and being present in setting proportions, said aqueous sodium silicate solution being present in proportions sufficient to react with said silicon and said sodium fluosilicate to effect foam production and setting, respectively, and said surface active agent being a quaternary ammonium salt of the type $$[(R)N(CH_3)_3]^+X^-$$

wherein "R" is an alkyl group containing at least 16 carbon atoms up to 18 carbon atoms and wherein "$X^-$" is a halogen ion; whereby the components of the mixture interact to produce a solidified mineral foam.

2. A process for the production of a solidified mineral foam which comprises intimately mixing silica, active silicon, aqueous sodium silicate solution wherein the ratio of $Na_2O$ to $SiO_2$ is in the range of from about 1:3.22 up to 1:2.90, sodium fluosilicate, and a surface active agent, said silica having a maximum particle size of through 325 mesh, the weight ratio of silica to sodium silicate solution being in the range of from about 2.3:1 to about 0.73:1, said active silicon having a maximum particle size of through 400 mesh, the weight ratio of active silicon to sodium silicate solution being equivalent to those for a weight ratio in the range of 0.0125 to 0.0625 part of active silicon per part of aqueous sodium silicate solution having a weight ratio of $Na_2O$ to $SiO_2$ of about 1:2.9, said sodium fluosilicate having a maximum particle size of through 325 mesh, the weight ratio of sodium fluosilicate to sodium silicate solution being equivalent to those for a weight ratio in the range of from about 0.172 to about 0.064 part of sodium fluosilicate per part of sodium silicate solution having a weight ratio of $Na_2O$ to $SiO_2$ of about 1:2.9; and said surface active agent being a quaternary ammonium salt of the type $[(R)N(CH_3)_3]^+X^-$ wherein "R" is an alkyl group containing at least 16 carbon atoms and up to 18 carbon atoms and wherein "X−" is a halogen ion; whereby the components of the mixture interact to produce a solidified mineral foam.

3. A process for the production of a solidified mineral foam which comprises intimately mixing silica, silicon having an oxide film, aqueous sodium silicate solution wherein the ratio of $Na_2O$ to $SiO_2$ is in the range of from about 1:2.54 up to about 1:2.00, sodium fluosilicate, and a surface active agent, said silica having a maximum particle size of through 325 mesh and being present in filler proportions, said silicon having a maximum particle size of through 400 mesh and being present in foam-producing proportions, said sodium fluosilicate having a maximum particle size of through 325 mesh and being present in setting proportions, said aqueous sodium silicate solution being present in proportions sufficient to react with said silicon and said sodium fluosilicate to effect foam production and setting, respectively, and said surface active agent being a quaternary ammonium salt of the type $$[(R)N(CH_3)_3]^+X^-$$

wherein "R" is an alkyl group containing at least 16 carbon atoms and up to 18 carbon atoms and wherein "X−" is a halogen ion, whereby the components of the mixture interact to produce a solidified mineral foam.

References Cited in the file of this patent
UNITED STATES PATENTS

| | | |
|---|---|---|
| 1,818,888 | Frank et al. | Aug. 11, 1931 |
| 2,921,357 | Fujii et al. | Jan. 19, 1960 |

FOREIGN PATENTS

| | | |
|---|---|---|
| 336,318 | Great Britain | Oct. 16, 1930 |
| 633,114 | Great Britain | Dec. 12, 1949 |
| 663,568 | Great Britain | Dec. 27, 1951 |

OTHER REFERENCES

Mellor: "Comprehensive Treatise in Inorganic and Theoretical Chemistry," published 1925 by Longmans Green (volume VI, page 161 relied upon).

---

UNITED STATES PATENT OFFICE
CERTIFICATE OF CORRECTION

Patent No. 3,136,645          June 9, 1964

Howard M. Dess

It is hereby certified that error appears in the above numbered patent requiring correction and that the said Letters Patent should read as corrected below.

Column 2, Table I, after each of the grades N, K, M, and C insert an asterisk; immediately following the table insert -- *Reg. Trademark of Philadelphia Quartz Company --.

Signed and sealed this 6th day of April 1965.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,136,645

June 9, 1964

Howard M. Dess

It is hereby certified that error appears in the above numbered patent requiring correction and that the said Letters Patent should read as corrected below.

Column 2, Table I, after each of the grades N, K, M, and C insert an asterisk; immediately following the table insert -- *Reg. Trademark of Philadelphia Quartz Company --.

Signed and sealed this 6th day of April 1965.

(SEAL)
Attest:

ERNEST W. SWIDER
Attesting Officer

EDWARD J. BRENNER
Commissioner of Patents